(12) United States Patent
Bosch et al.

(10) Patent No.: US 8,162,207 B2
(45) Date of Patent: *Apr. 24, 2012

(54) CURRENCY DISPENSE AND CONTROL SYSTEM WITH ANTI-THEFT FEATURES

(75) Inventors: Samuel H. Bosch, Portland, OR (US); Jonathan H. Bosch, Hillsboro, OR (US)

(73) Assignee: Peregrin Technologies, Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/790,401

(22) Filed: May 28, 2010

(65) Prior Publication Data

US 2010/0241562 A1      Sep. 23, 2010

Related U.S. Application Data

(63) Continuation of application No. 10/738,696, filed on Dec. 16, 2003, now Pat. No. 7,726,557.

(60) Provisional application No. 60/433,906, filed on Dec. 16, 2002.

(51) Int. Cl.
| | |
|---|---|
| *G07D 11/00* | (2006.01) |
| *G07F 19/00* | (2006.01) |
| *G06K 5/00* | (2006.01) |
| *G06K 19/06* | (2006.01) |

(52) U.S. Cl. .................. 235/379; 235/380; 235/493
(58) Field of Classification Search ............. 705/35–43; 235/380, 379, 493
See application file for complete search history.

(56) References Cited

U.S. PATENT DOCUMENTS

| | | | |
|---|---|---|---|
| 3,941,977 A | 3/1976 | Voss et al. | |
| 3,949,364 A | 4/1976 | Clark et al. | |
| 4,134,537 A | 1/1979 | Glaser et al. | |
| 4,197,986 A | 4/1980 | Nagata | |
| 4,294,380 A | 10/1981 | Rankin | |
| 4,650,977 A | 3/1987 | Couch | |
| 4,650,978 A | 3/1987 | Hudson et al. | |
| 4,660,168 A | 4/1987 | Grant et al. | |

(Continued)

FOREIGN PATENT DOCUMENTS

EP        0242624        10/1987

(Continued)

OTHER PUBLICATIONS

Canadian Intellectual Property Office, Office Action, Canadian Patent Application No. CA 2,509,648, dated Jan. 26, 2011, 5 pages.

(Continued)

*Primary Examiner* — Thien T Mai
(74) *Attorney, Agent, or Firm* — Stoel Rives LLP

(57) ABSTRACT

A cost-effective, currency dispense and control system (CDCS) securely dispenses paper money in one of the following modes: (1) an ATM system and (2) a currency control system that allows a merchant or merchant-approved employee to withdraw cash from the CDCS independent of a standard ATM electronic fund transfer (EFT) network. The CDCS may also include the following functionalities: a duress dispensation system that allows the CDCS to activate an alarm and/or otherwise communicate with local police or security services during a robbery, a time-release system that effects a time-delayed dispensation functionality, and a user identification and authentication system for authenticating a user identity and determining eligibility of the user to access the currency control system.

32 Claims, 3 Drawing Sheets

U.S. PATENT DOCUMENTS

| | | | |
|---|---|---|---|
| 4,928,001 A | | 5/1990 | Masada |
| 5,220,157 A | | 6/1993 | Martin et al. |
| 5,340,967 A | * | 8/1994 | Martin et al. .................. 235/379 |
| 5,546,523 A | * | 8/1996 | Gatto ............................ 235/379 |
| 5,650,604 A | | 7/1997 | Marcous et al. |
| 5,773,804 A | | 6/1998 | Baik |
| 5,838,773 A | | 11/1998 | Eisner et al. |
| 5,883,371 A | | 3/1999 | Meeker |
| 5,897,625 A | | 4/1999 | Gustin et al. |
| 5,937,396 A | | 8/1999 | Konya |
| 6,000,555 A | | 12/1999 | Anma |
| 6,009,408 A | | 12/1999 | Buchanan |
| 6,081,792 A | | 6/2000 | Cucinotti et al. |
| 6,176,423 B1 | | 1/2001 | Egami |
| 6,196,456 B1 | | 3/2001 | Taylor |
| 6,213,341 B1 | * | 4/2001 | Keith et al. ....................... 221/6 |
| 6,285,988 B1 | | 9/2001 | Nogami |
| 6,304,860 B1 | | 10/2001 | Martin, Jr. et al. |
| 6,442,690 B1 | | 8/2002 | Howard et al. |
| 6,502,746 B1 | * | 1/2003 | Do et al. ...................... 235/379 |
| 6,508,397 B1 | * | 1/2003 | Do ................................ 235/379 |
| 6,523,743 B1 | | 2/2003 | Patterson et al. |
| 6,540,136 B1 | | 4/2003 | Ross |
| 6,754,822 B1 | | 6/2004 | Zhao |
| 7,726,557 B2 | | 6/2010 | Bosch et al. |
| 2002/0032655 A1 | * | 3/2002 | Antonin et al. ................. 705/43 |
| 2002/0036159 A1 | | 3/2002 | Graef et al. |
| 2002/0122568 A1 | | 9/2002 | Zhao |
| 2002/0138446 A1 | | 9/2002 | Antonin et al. |
| 2003/0025617 A1 | | 2/2003 | Kunigkeit et al. |
| 2003/0141372 A1 | | 7/2003 | Brown et al. |
| 2010/0312701 A1 | | 12/2010 | Bosch et al. |

FOREIGN PATENT DOCUMENTS

| | | |
|---|---|---|
| EP | 0580297 A2 | 7/1997 |
| EP | 0822525 A2 | 2/1998 |
| FR | 2350652 | 12/1977 |
| WO | WO 94/11836 | 5/1994 |

OTHER PUBLICATIONS

European Patent Office, Examination Report, European Patent Application No. EP 03814137, dated Jan. 25, 2011, 7 pages.

European Patent Office, Supplementary European Search Report, European Patent Application No. EP 03814137, dated Jul. 6, 2006, 4 pages.

International Searching Authority, International Search Report, International PCT Application No. PCT/US03/40288, dated Apr. 28, 2004, 3 pages.

Tidel Engineering, L.P. Product Information, http://www.Tidel.com/products.asp, 2002, visited Dec. 9, 2002, 3 pages.

NKL, Presenting Autobank and Intellisafe by NKL (a product brochure), 2001, 16 pages.

Triton Systems, Inc., Triton 9700 Product Brochure, 2001, 2 pages.

Armor Safe Technologies, Products, http://www.armorsafe.com/products/cs7000.html, 2000, visited Dec. 9, 2002, 4 pages.

* cited by examiner

CURRENCY DISPENSE AND CONTROL SYSTEM WITH ANTI-THEFT FEATURES

RELATED APPLICATIONS

This application is a continuation of and claims the benefit under 35 U.S.C. §120 from U.S. patent application Ser. No. 10/738,696, filed Dec. 16, 2003, which claims the benefit under 35 U.S.C. §119(e) of U.S. Provisional Patent Application No. 60/433,906, filed Dec. 16, 2002, both of which are hereby incorporated herein by reference in their entireties.

TECHNICAL FIELD

The field of the present disclosure relates to a currency dispense and control system (CDCS), and more particularly, to a CDCS including an automated teller machine (ATM) system and a currency control system that effects time-delayed dispensation of on-site currency independent of an electronic fund transfer (EFT) network.

BACKGROUND INFORMATION

Controlled-Access Dispensing Safes

In the 1970s, when convenience stores began extending their hours, the incidence of armed robberies increased at an alarming rate. Specifically, from 1968 to 1973, robberies of chain stores increased by 167%, compared to an overall increase in robberies of 39% during the same period. The Western Behavioral Sciences Institute, under a grant from the National Institute of Justice and in cooperation with Southland Corporation, conducted research, including social studies of convicted armed robbers, to look at the stores from the robbers' perspective and then devise countermeasures to deter theft. The studies determined that two of the most important factors to a criminal in selecting a store to rob were (1) "the availability of cash" and (2) "the ability to get it quickly." Tidel Engineering, L.P. "Cash Control: Pioneering Retail Security," available at http://www.tidel.com/about_industry_retailcash.asp (last visited Dec. 11, 2002).

In about 1977, Tidel Engineering, L.P. (Tidel), a division of Southland Corporation, was formed to develop and produce controlled-access, time-release safes into which money is deposited and from which money is dispensed in a controlled, and preferably recorded, manner. Because these safes limited the amount of money stolen during a robbery, they consequently reduced the incidence of robbery in those establishments having a time-release safe. Specifically, the use of a time-release safe to store an establishment's change fund and excess cash made a commercial establishment less attractive to a potential robber because, other than the minimal required amount in the cash register, there was little readily available cash in the store. Because a time-release safe is programmed to dispense a specified amount of cash on a time-delay basis as a merchant or merchant-approved employee requires funds, (e.g., not more than once every five minutes), a store's excess cash is not available quickly and the robber is forced to go elsewhere. Id. Further, the fact that the safe is programmed to dispense a specific amount of cash no more than once during a certain time period (which period can range from one to 99 minutes) means that, when confronted with a robbery, a merchant or merchant's employee cannot be forced to dispense more than the maximum amount of money the safe has been programmed to dispense, unless the robber is willing to wait until the time delay has expired. Thus, in most instances, a robber will take only the cash in the cash register and the maximum amount dispensed by the time-release safe, limiting the merchant's monetary loss to a few hundred dollars.

During the period from 1975 to 1986 (the 12-year period after Tidel began implementing its first theft-protection time-release safes), convenience stores having these safes experienced a 65% decrease in robberies nationwide. Ten years later, that figure was unchanged despite an increase in robberies elsewhere during the decade. FBI statistics reflect a remarkable nationwide decrease in the incidence of armed robbery in convenience stores from Tidel's inception through 1992. According to the convenience store industry, robberies declined by another 45% from 1992 to 1998. Id.

These time-release safes typically include eight columns of tubes, each column including 12 plastic dispensing tubes approximately 4 inches long and 1¼ inches in diameter. Each column dispenses from its tubes a specified amount and form of money, such as a roll of coins (e.g., $2 worth of nickels or $5 worth of dimes) or a paper bill (e.g., denominations of one, five, ten, or twenty dollars). Each column has an opening at the top that is formed such that it accepts tubes of money one at a time. When a merchant needs cash, the safe's money is accessed by keying into an electronic numerical keypad the appropriate personal pin identification number (PIN) and the amount of money needed. An electronic control system determines from which columns and tubes money is dispensed in order to provide the requested amount of money. Depending on the sophistication of the safe, the merchant, owner, or manager often has the ability to generate reports listing all transactions (deposits and withdrawals) made during a certain time period. The report often includes the following information for each listed transaction: the unique ID number of the individual who made the transaction, the time the transaction was made, and the transaction amount. The ability to generate these reports further facilitates management control of on-site cash, which has historically been a problem for merchants, who are often plagued by "shrinkage." Shrinkage is the term sometimes used in the retail industry for inventory (cigarettes, candy, beer/soft drinks, etc.) and money/cash that "disappears" from a merchant's location and that cannot be accounted for. Typically an employee is suspected of taking the money but without any proof the merchant cannot prosecute anyone.

Cash-dispensing safes now include sophisticated electronics and software that enable them to perform various services and functions. The current vendors producing these cash-control dispensing safes are Armor Safe Technologies in Vista, Calif.; Tidel in Carrollton, Tex.; FireKing® International in New Albany, Ind.; AT Systems in Indianapolis, Ind.; and McGunn Safe Co. in Des Plaines, Ill. The cost of these safes ranges from $2,500 to $5,000 each, depending on their capacity and features.

Automated Teller Machines

ATMs dispense cash directly from a user's bank account. The primary vendors are Docutel, Inc. of Dallas, Tex.; Diebold, Inc. (Diebold) of North Canton, Ohio; IBM of New York; and NCR Corporation (NCR) of Dayton, Ohio. Foreign vendors include Fujitsu in Japan, Siemens in Europe, and Nixdorf in Europe. ATMs, costing $20,000 to $40,000 each and requiring dedicated, and thereby expensive, leased telephone lines, are typically purchased by banks and are generally installed at a bank or at a location having a business relationship with a bank. In about 1992, Tidel produced a dial-up ATM, which was based on a combination of the company's tube dispensing, cash-control safe (see above) and an off-the-shelf Verifone credit/debit card point-of-sale terminal. Although the resulting ATM had limited capabilities in comparison with the Diebold and IBM ATMs, it cost only approximately $8,000 to $10,000 and did not require the use of a dedicated leased telephone line. Consequently, it was very successful at convenience stores and similar merchant locations.

A few years later, Triton Systems (Triton) of Long Beach, Miss. started marketing the 9500 series of ATMs, which were a combination of the Triton terminal that trained customers to use ATMs, which Triton had been selling to banks, and a currency dispenser (or bill dispenser) similar to one sold by De La Rue, plc. of Basingstoke, Hampshire, England. The resulting product was much closer in operation and ease of use to the products of Diebold and NCR. Specifically, it eliminated the need to load cash into individual tubes and was thus very successful. Since then, many vendors, including Tidel and Tranax out of Korea, have introduced similar systems into the market. These three companies are now the most successful vendors in the United States ATM market. The newest ATM products, whose sales number in the hundreds of thousands, are not true ATMs, but rather are cash dispensers that do not accept deposits or include the full repertoire of functions provided by the more expensive ATMs. These merchant or off-site ATMs, as they are now called, sell for approximately $4,000 to $8,000 each.

More Recent Concerns in Light of Technological Advances

As stated above, convenience stores, quick-service restaurants, and similar merchant sites are continually attempting to formulate a method by which they can limit the incidence of robbery and the amount of money stolen during a robbery of their establishments. While recent technological advances in time-release safe design have aided in effecting a decrease in robberies, the increasing popularity of electronic gaming stations (e.g., video poker) in many establishments, in combination with the market and consumer pressure to immediately distribute winnings in cash, has resulted in an increase in robberies of commercial establishments having electronic gaming stations. The high cost of purchasing both an ATM and a time-release safe limits many merchants from purchasing both machines. Further, both machines occupy a significant amount of space that merchants are often unable or unwilling to provide. Lastly, some establishments having electronic gaming stations are required by state law to have sufficient cash available to pay up to a certain dollar amount in winnings. In other states, such as Oregon, an establishment that has video poker can pay winnings by cash, check, or a combination thereof, regardless of the amount of the winnings. However, video poker players (customers) prefer to be paid in cash, not by check. Because merchants do not want to discourage players from using the gaming stations or otherwise cause them to leave the establishment, merchants prefer to give their customers the instant gratification of receiving cash. The time-release safes including tube machines are inconvenient for this purpose because they were designed for use in convenience stores, where coins and small bills were the most commonly used currency. However, in establishments having electronic gaming stations, merchants need large-denomination bills rather than coins and small-denomination bills, so that they can pay out large amounts of money to electronic gaming station winners.

Thus the present inventors recognized a need for a CDCS including an ATM system and a controlled-access dispensing safe. Tidel invented a cash dispensing system that "emulates an ATM to access and perform transactions through the EFT system and activates a printer to issue scrip representative of authorized cash disbursements" (abstract of U.S. Pat. No. 5,220,157). However, the present inventors recognized that the Tidel system has two drawbacks. First, all transactions are dependent on an EFT network host. Maintaining an EFT host is expensive, and when the connection with the EFT host becomes unavailable due to power disruption, inclement weather, a busy phone line, or inoperational hardware, the system cannot be used. Second, all transactions result in the dispensation of scrip rather than cash. Customers have to take the scrip, wait in line, and exchange their scrip for cash. This time-consuming process inconveniences the customer and requires the establishment to have sufficient people working at each shift to perform this duty in addition to their other responsibilities.

Consequently, the present inventors have recognized a need for a cost-effective CDCS including an ATM system and a controlled-access dispensing safe that operates independent of an EFT network and that dispenses cash.

SUMMARY

The present disclosure relates to an improved, cost-effective currency dispense and control system (CDCS). In a preferred embodiment, the CDCS includes an automated teller machine (ATM) system and a controlled currency control system that operates independent of an electronic fund transfer (EFT) network and that securely dispenses cash.

The CDCS includes (1) an ATM system and (2) a currency control system that effects dispensation of on-site currency independent of an EFT network. The currency control system may also receive currency for immediate storage or disbursement through the ATM or currency control portions of the CDCS.

The currency control system may also include a user identification and authentication system for authenticating a user's identity and determining eligibility of the user to access the currency control system. One preferred implementation of the user identification and authorization system requires entry of a user identifier and a personal identification code that are compared with a master list defining a set of users entitled to access the currency control system. The currency control system may also include a report-generating system that preferably prepares, records, and prints a list of dispensations of on-site currency.

The currency control system may also generate a timed delay between dispenses; the timed delay may be generated either before or after each dispensation. The CDCS may also include a dispensation timing system that regulates the timing of each dispensation such that a dispensation may be effected only during a specified period of time, thereby preventing dispenses of currency outside of the specified period of time. For example, the specified time periods may include an establishment's hours of operation and the hourly intervals of each shift.

The CDCS may also include theft-deterrent functionalities. By way of example, theft-deterrent functionalities include (1) the currency control system having a configurable maximum single dispensation amount and (2) the currency control system including a duress dispensation system that activates an alarm and/or otherwise communicates with local police or security services in the event of a robbery.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
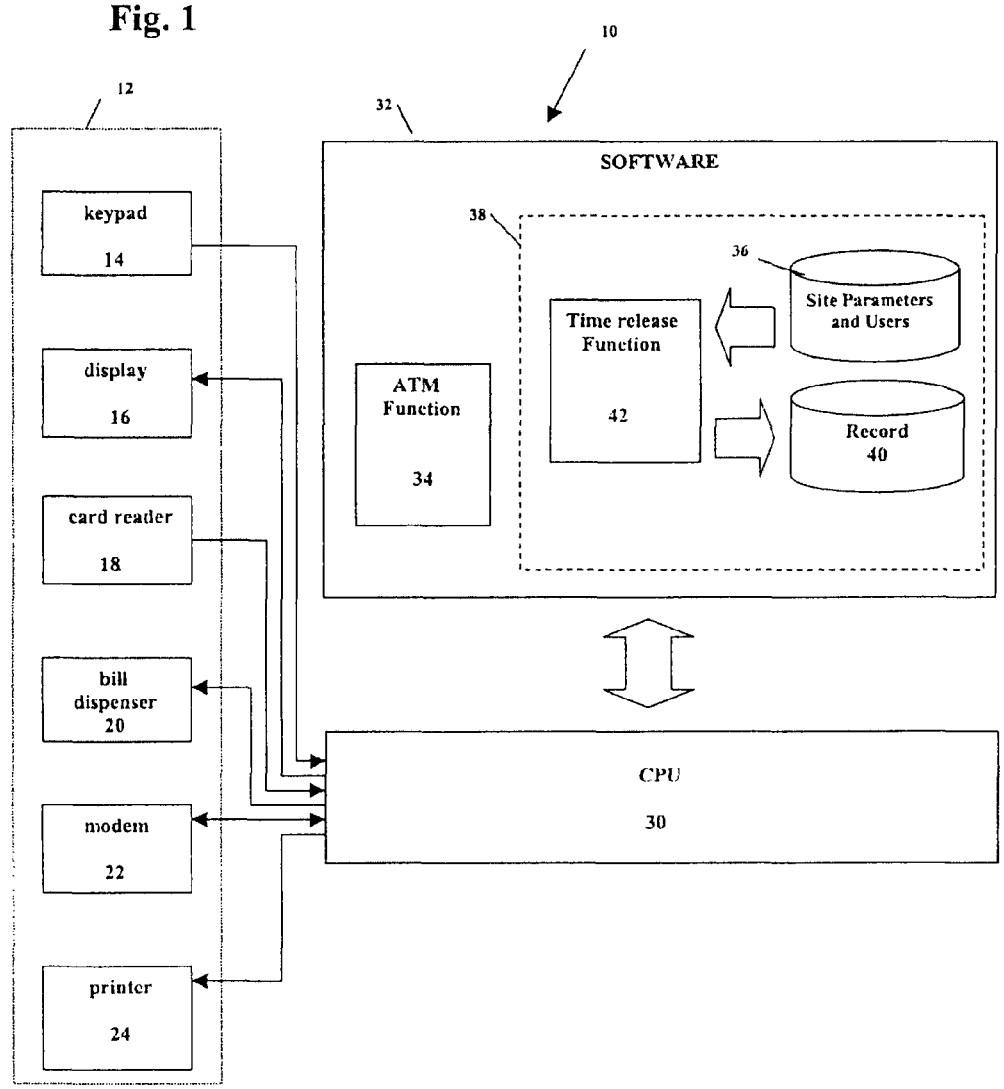
FIG. 1 is a block diagram showing the functional portions of a CDCS according to one embodiment and the interaction between the ATM system and the currency control system.

FIG. 1 illustrates a CDCS 10 capable of performing both traditional automated teller machine (ATM) transactions and merchant-initiated currency control transactions, according to one embodiment. To minimize the cost of the CDCS and the floor space occupied by the CDCS, both the ATM and the merchant-initiated currency control transactions are preferably performed by standard ATM hardware whose software has been configured to effect both transactions. However, in an alternative implementation, the currency control system or module may be housed in a device that is located peripherally to the portion of the CDCS housing the ATM system (not shown).

Standard ATM hardware includes a collection of input and output devices 12 that accept, transmit, and respond to user requests for cash withdrawal. Input and output devices 12 include a keypad 14 into which the user enters his or her identifying information and cash withdrawal request information, a display 16 that effects communication between the user and the ATM system, a card reader 18 that recognizes a card having a unique magnetic stripe and reads the information contained on the magnetic stripe, a bill dispenser 20 that dispenses currency to the user, a modem 22 that is connected to an EFT network and that communicates with the lending institution associated with the ATM system, and a printer 24 that prints receipts for the users of the ATM system and summary reports for the owner of the establishment at which the CDCS is housed.

Input and output devices 12 interact with a CPU 30, which interacts with a software system 32. Software system 32 is designed to include ATM transactional software 34 and merchant-initiated currency control transactional software 38. Several interactions between ATM transactional software 34 and merchant-initiated currency control transactional software 38 are shown in the flow diagrams of FIGS. 2 and 3.

Standard ATM operation is well known to those skilled in the art. However, a brief summary of the operational parameters in effect when CDCS 10 is operating in standard ATM mode is as follows. As directed by display 16, a user places his or her bank-issued ATM card into card reader 18 and enters a personal identification number (PIN) using keypad 14. Once the CPU has verified the identity of the user using the EFT network accessed through modem 22, the user may access funds being stored in the user's bank account. The user may, at his or her option, deposit money into and/or withdraw money from the user's bank account. Withdrawn money is immediately dispensed by bill dispenser 20 as cash.

When CDCS 10 is operating in currency control mode, a merchant or merchant-approved employee can withdraw cash from CDCS 10 independent of an EFT network. A brief summary of an exemplary series of operational parameters in effect when CDCS 10 is operating in currency control mode is as follows. The merchant or merchant-approved employee inserts or swipes a magnetic stripe card into or through card reader 18. Following a prompt that appears on display 16, the merchant or merchant-approved employee types into keyboard 14 a PIN, which is preferably a numeric code between four and six digits in length. Software 32 includes a user identification and authentication system for authenticating the user's identity and determining eligibility of the user to access the currency control system. This portion of software 32 processes the data presented by the magnetic stripe card and the PIN and recognizes that the user is not requesting use of the ATM system. The user identification and authentication system instructs software 32 not to use modem 22 to call a bank via the EFT network. By way of display 16, the merchant or merchant-approved employee is asked to use keypad 14 to enter a desired withdrawal amount. The data on the magnetic-stripe card and the PIN are compared with data tables stored in software 32 to verify that the merchant or merchant-approved employee is a valid currency control system user. Following a sequence of software processing steps that are described in greater detail below, the requested withdrawal amount is dispensed by bill dispenser 20 in the form of cash.

In one preferred implementation of CDCS 10, a recordation system 40 records the amount of money that was dispensed, the identification information relating to the merchant or merchant-approved user that requested the money, and the date and time of the dispensation. Optionally, some or all of this data can be used by a report-generating system within software 32 to generate shift and day reports that can be printed using printer 24. For example, CDCS 10 can generate reports listing the number of ATM or currency control system withdrawals in a given time period and the amount of money withdrawn or deposited for each ATM transaction or currency control transaction. Further, CDCS 10 could generate separate reports for employees and more detailed reports for the merchant or the owner of CDCS 10.

In another preferred implementation, CDCS 10 includes a dispensation control system that compares the desired withdrawal amount entered by the merchant or merchant-approved user with parameter data 36 stored in software 32. If the desired withdrawal amount exceeds the maximum withdrawal amount defined as a parameter 36 of software 32, the operating sequence is terminated and the user may preferably be asked to enter an alternative desired withdrawal amount. If all of three separately entered desired withdrawal amounts exceed the maximum withdrawal amount, the user is informed by an error message that appears on display 16 that the transaction has been terminated. In instances in which the user's magnetic stripe card was inserted into CDCS 10, it is preferably expelled and returned to the user; alternatively, the magnetic stripe card may be confiscated by CDCS 10.

If an appropriate desired withdrawal amount is entered, CDCS 10 either dispenses the requested cash (when the CDCS includes a postdelay dispensation or when the CDCS lacks a timed delay dispensation functionality) or enters a delay period during which CDCS 10 becomes inactive, as described above. Upon expiration of the delay period, display 16 may dispense the cash or may request that the user reenter the user's PIN. In the latter instance, the time-release system sends a signal to bill dispenser 20 instructing it to effect currency dispensation following correct reentry of the PIN. Correct reentry of the PIN may also optionally initiate recording of the dispensation.

In an alternative preferred implementation, CDCS 10 includes a dispensation timing system that regulates the timing of each currency control system dispensation such that a dispensation may be effected only during a specified period of time, thereby preventing dispenses of currency outside of the specified period of time. This system ensures authorization of the card holder to withdraw money at a specific time. For example, the CDCS could be programmed so that no cash withdrawals are permitted during certain time periods, such as when the store is closed. In this way, the dispensation timing system minimizes the incidence of robbery of the safe by either employees or outsiders. As another example, a first-shift employee would not be eligible to withdraw currency from the CDCS during the second or third shift time intervals. In this implementation, currency control system or module 38 compares the time of day at which the currency control system dispensation is requested to the permissible dispensation times listed in a set of tables housed in site parameters 36 of software 32. If the user is not authorized to request a dispensation at that time, the transaction sequence is terminated. The user is preferably informed of the termination of the transaction sequence by an error message that appears on display 16. The error message may indicate, for example, that that user is ineligible for dispenses at that time.

In another preferred implementation, CDCS 10 includes a time release system 42 that prevents CDCS 10 from conducting another currency control system-generated cash dispensation for a preprogrammed period of time before or after a currency dispensation. A preferred period of time is between about one minute to about 99 minutes. Currency control system 38 may generate a timed delay between dispenses, a predispensation delay, a postdispensation delay, or a combination thereof. One advantage of a predispensation delay is that it deters theft of the commercial establishment since a robber would have to wait in the commercial establishment, risking detection and/or capture, until the delay period expired before he or she was able to obtain currency dispensation. In an alternative preferred embodiment, CDCS 10 includes a clock that alerts the user to the delay. The clock can count either up to reach the total time of the delay or down from the total time of the delay.

Figure 2:
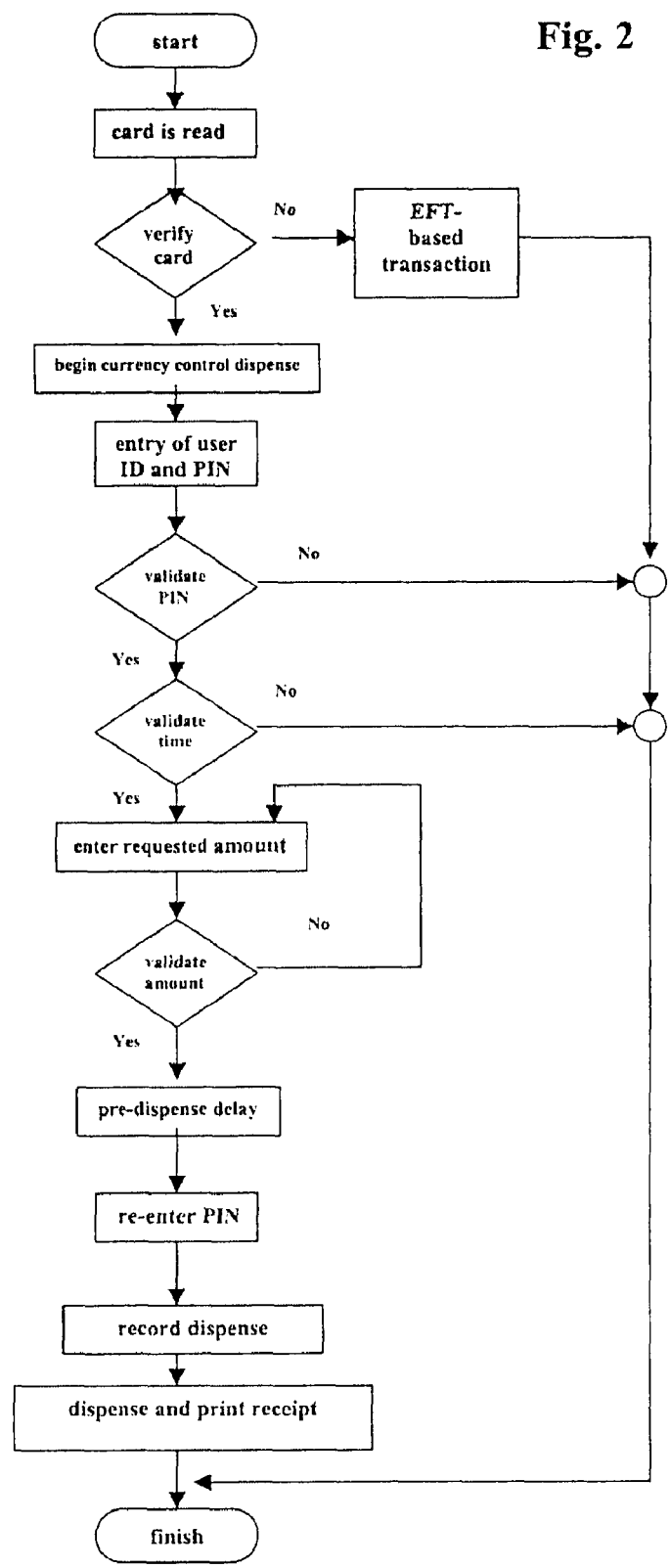
FIG. 2 is a flow diagram showing an exemplary set of steps for operation in the CDCS of FIG. 1 to effect a predelay dispensation operational path.

FIG. 2 is a flow diagram showing an exemplary set of steps comprising a predelay dispensation operational path for operation in a CDCS having a time release system and requiring that the user reenter the user's PIN following the predispensation delay. First, card reader 18 reads the inserted or swiped magnetic stripe card. Then, a comparison of the data on the card with data tables stored in site parameters 36 is conducted by software 32. If a match is not found, the transaction is assumed to be a standard ATM transaction and modem 22 contacts an EFT network. If a match is found, the merchant or merchant-approved user is asked to enter his or her user ID and/or PIN.

Next, a comparison of the entered identification data with data tables stored in site parameters 36 of software 32. If a match is not found, an error message appears on display 16. If a match is found, a time release system verifies that the merchant or merchant-approved user is permitted to withdraw currency at the time at which the currency is requested. To effect this determination, a comparison of the entered identification data with time release data tables stored in the site parameters 36 portion of software 32 is conducted. If a match is not found, an error message appears on display 16. If a match is found, CDCS 10 posts a message on display 16 requesting that the merchant or merchant-approved user enter the requested withdrawal amount using keypad 14. A dispensation control system compares the desired withdrawal amount entered by the merchant or merchant-approved user with parameter data 36. If the desired withdrawal amount exceeds the maximum withdrawal amount defined as a parameter data 36, the operating sequence is terminated and the merchant or merchant-approved user may preferably be asked to enter an alternative desired withdrawal amount. If all of three separately entered desired withdrawal amounts exceed the maximum withdrawal amount, the merchant or merchant-approved user is informed by an error message that appears on display 16 that the transaction has been terminated.

If the requested withdrawal amount is accepted, CDCS 10 preferably posts a message on display 16 informing the merchant or merchant-approved user that CDCS 10 is entering a timed delay phase during which currency control system 38 is inaccessible for further transactions. The timed delay may last anywhere from one minute to 99 minutes. Following expiration of the timed delay period, the merchant or merchant-approved user is asked to reenter his or her PIN number. Another comparison of the entered identification data with data tables stored in the site parameters 36 is conducted. If a match is not found, an error message appears on display 16. If a match is found, the currency is dispensed and the dispensation is recorded. Preferably, printer 24 prints a receipt for the merchant or merchant-approved user.

In another preferred implementation, CDCS 10 includes a dispensation control system that compares the desired withdrawal amount entered by the merchant or merchant-approved user with parameter data 36 stored in software 32. If the desired withdrawal amount exceeds the maximum withdrawal amount, the operating sequence is terminated and the merchant or merchant-approved user may preferably be asked to enter an alternative desired withdrawal amount. If all of three separately entered desired withdrawal amounts exceed the maximum withdrawal amount, the merchant or merchant-approved user is informed by an error message that appears on display 16 that the transaction has been terminated. If the requested withdrawal amount is accepted, the dispensation is effected. According to one embodiment, maximum dispensation amounts are between about $100 and about $500, but the maximum dispensation amount may be programmed by the owner/operator of the establishment housing the CDCS.

CDCS 10 may also include a user identification and authorization system that mandates entry of a user identifier and/or personal identification code related to each individual user or each individual site. For example, the user identification and authorization system may require entry of a user identifier and a personal identification code that are compared with a master list defining a set of users entitled to access the currency control system. The user identifier may be, for example, data contained on the magnetic swipe card or any other identifying user data, such as a PIN or biometric data such as a retinal scan, fingerprint scan, or RF identification. For example, in one preferred implementation, currency control system 38 is activated by the insertion or swiping of magnetic cards including magnetically embedded data that instructs the CDCS not to use the EFT network. In an alternative preferred implementation, currency control system 38 is activated by the entry of a PIN. The user identifier and/or PIN correlate to a user known by software 32 and stored in a reference table housed in parameter data 36. When the data entered into the user identification and authorization system is incorrect, the transaction is preferably voided and display 16 informs the merchant or merchant-approved user that the user's PIN is invalid.

In an alternative preferred implementation, the currency control system includes a duress dispensation system that alerts a set of individuals to the occurrence of a robbery when a merchant or merchant-approved user is forced to request a dispensation against his or her will. For example, when a merchant or merchant-approved user is being threatened by a robber who is demanding money, the merchant or merchant-approved user requests a dispensation using the above-mentioned magnetic stripe card. The merchant or merchant-approved user may then enter a duress dispensation PIN that causes the preprogrammed amount of cash to be dispensed and recorded while an external and/or internal operation alerts a set of individuals to the occurrence of a robbery. Exemplary external operations include alerting the police, a private security company, and/or management of the establishment to the presence of a robber. Exemplary internal operations include custom hardware that interfaces with an input/output port to trigger an on-site silent alarm system, on-site cameras, or on-site video recorders. Being unfamiliar with operation of CDCS 10, the robber is unaware that a duress code has been entered. To avoid arousing suspicion by the robber and to make it easy for the merchant or merchant-approved user to remember the duress dispense, a preferred duress dispensation PIN is similar in length to the normal PIN. For example, instead of entering the correct PIN, the PIN may be modified by adding or subtracting a digit from the last digit in the PIN (e.g., a PIN of 1234 has a duress dispensation PIN of 1235 or 1233). However, any suitable transformation of the PIN will work. Further, the duress dispensation PIN may be a duress code that is recognized for all users. For example, a PIN of 6666 could be the duress dispensation code for all users.

Figure 3:
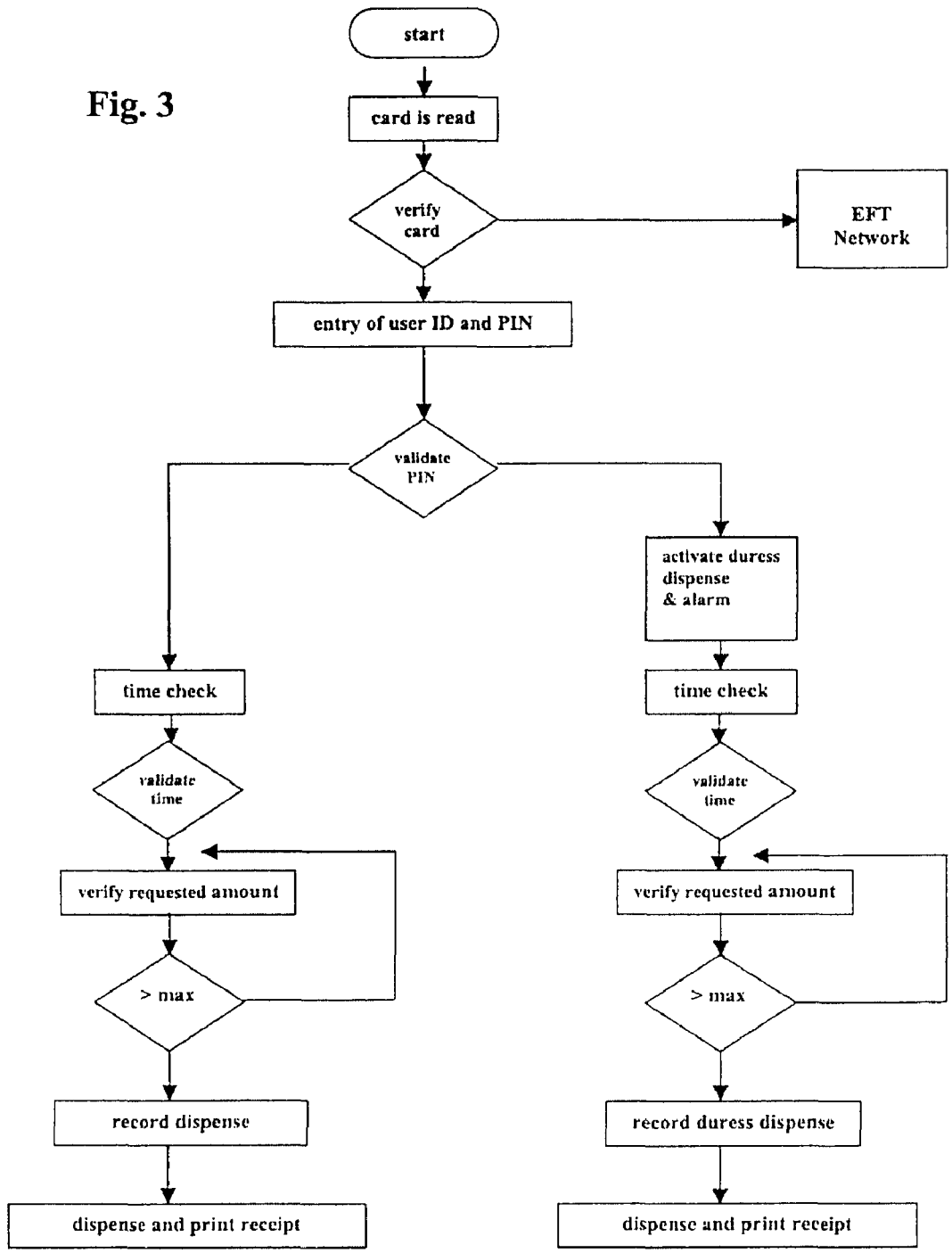
FIG. 3 is a flow diagram showing an exemplary set of steps for operation in the CDCS of FIG. 1 to effect a duress dispensation operational path.

FIG. 3 is a flow diagram showing an exemplary set of steps comprising a duress dispensation operational path for operation in a CDCS having a time release system. First, card reader 18 reads the inserted or swiped magnetic stripe card. Then, software 32 effects a comparison of the data on the card with data tables stored in site parameters 36. If a match is not found, the transaction is assumed to be a standard ATM transaction and modem 22 contacts an EFT network. If a match is found, the merchant or merchant-approved user is asked to enter his or her user ID and/or PIN. The user enters his or her duress dispensation PIN.

Next, software 32 effects a comparison of the entered PIN with data tables stored in site parameters 36. If a match is not found, an error message appears on display 16. If a match is found, software 32 performs an internal and/or external operation to alert specified individuals of the occurrence of a robbery. Simultaneously, a time release system verifies that the merchant or merchant-approved user is permitted to withdraw currency at the time at which the currency is requested. To effect this determination, software 32 effects a comparison of the entered PIN with time release data tables stored in site parameters 36. If a match is not found, an error message appears on display 16. If a match is found, CDCS 10 posts a message on display 16 requesting that the merchant or merchant-approved user enter the requested withdrawal amount using keypad 14. A dispensation control system compares the desired withdrawal amount entered by the merchant or merchant-approved user with parameter data 36 stored in software 32. If the desired withdrawal amount exceeds the maximum withdrawal amount defined as a parameter of parameter data 36, the operating sequence is terminated and the merchant or merchant-approved user may preferably be asked to enter an alternative desired withdrawal amount. CDCS 10 dispenses the currency and the dispensation is recorded as a duress dispense. Preferably, printer 24 prints a receipt for the merchant or merchant-approved user.

Use of CDCS 10 permits a commercial establishment to enjoy the advantages of having both a time-release safe and an ATM but eliminates the need to purchase both machines. Using CDCS 10, merchants can quickly remit large cash sums to winners of electronic gaming stations, cash checks for customers, pay for COD deliveries, etc., without keeping large sums of money in the cash register, thereby decreasing the establishment's attractiveness to robbers. Because currency control system 38 of CDCS 10 is locally operated independent of an external EFT network, use of currency control system 38 of CDCS 10 is faster and more reliable than using prior art ATM/time-release safe terminals.

It will be obvious to those having skill in the art that many changes may be made to the details of the above-described embodiments without departing from the underlying principles of the invention.

The invention claimed is:

1. A method comprising:
   receiving, at a currency dispense and control system, a currency dispense request from a user, wherein the currency dispense request (a) includes a desired withdrawal amount and (b) is input by the user via an input device;
   determining whether the currency dispense request requires approval using an electronic fund transfer network based on reading, via a card reader, magnetically embedded data stored on a user card, the magnetically embedded data bearing instructions that cause the currency dispense and control system not to use any electronic fund transfer network;
   if the currency dispense request is determined not to require approval using an electronic fund transfer network, determining independently of any electronic fund transfer network whether the user is authorized to receive the desired withdrawal amount; and
   if it is determined independently of any electronic fund transfer network that the user is authorized to receive the desired withdrawal amount, causing a currency dispenser to dispense an amount of currency corresponding to the desired withdrawal amount.

2. The method of claim 1, wherein the currency dispense request defines a currency dispense transaction and further comprising:
   prompting the user to enter a user identifier and a personal identification code;
   authenticating the user by comparing the user identifier and the personal identification code entered by the user with data in a master list, the data in the master list defining a set of valid user identifiers and personal identification codes associated with each user identifier; and
   if the user is not authenticated, presenting an indication to the user that the currency dispense request is denied and terminating said transaction without performing the step of determining independently of any electronic fund transfer network whether the user is authorized to receive the desired withdrawal amount.

3. The method of claim 1, wherein the step of determining independently of any electronic fund transfer network whether the user is authorized to receive the desired withdrawal amount comprises comparing the desired withdrawal amount to a maximum dispensation amount stored within the currency dispense and control system.

4. The method of claim 1, further comprising:
   after it is determined that the user is authorized to receive the desired withdrawal amount and before performing the step of causing the currency dispenser to dispense the amount of currency corresponding to the desired withdrawal amount, generating a time delay period during which no additional determinations of whether a user is authorized to receive a desired withdrawal amount are made;
   causing an indication to be presented to the user that the time delay period has begun; and after the time delay period has expired, performing the step of causing the currency dispenser to dispense the amount of currency corresponding to the desired withdrawal amount.

5. The method of claim 4, further comprising:
after the time delay period has expired and before dispensing the amount of currency corresponding to the desired withdrawal amount, prompting the user to enter a user identification code;
authenticating the user by comparing the user identification code entered by the user to data in a master list, the data in the master list defining a set of valid user identification codes; and
if the user is authenticated, causing the currency dispenser to dispense the amount of currency corresponding to the desired withdrawal amount.

6. The method of claim 1, further comprising:
after performing the step of causing the currency dispenser to dispense the amount of currency corresponding to the desired withdrawal amount and before receiving a different currency dispense request from a user, generating a time delay period during which no additional determinations of whether a user is authorized to receive a desired withdrawal amount are made.

7. The method of claim 1, wherein the currency dispense request defines a currency dispense transaction and further comprising:
before performing the step of causing the currency dispenser to dispense the amount of currency corresponding to the desired withdrawal amount, determining whether the currency dispense request is received during a specified period of time;
if it is determined that the currency dispense request is received during the specified period of time, performing the step of causing the currency dispenser to dispense the amount of currency corresponding to the desired withdrawal amount; and
if it is determined that the currency dispense request is received outside of the specified period of time, presenting an indication to the user that the currency dispense request is denied and terminating the currency dispense transaction.

8. The method of claim 1, further comprising:
before performing the step of determining whether the user is authorized to receive the desired withdrawal amount, prompting the user to enter a personal identification code;
determining whether the user entered a duress-dispensation personal identification code; and
if it is determined that the user entered a duress-dispensation personal identification code, alerting a set of individuals to an occurrence of a robbery and performing the step of determining whether the user is authorized to receive the desired withdrawal amount.

9. A method comprising:
receiving, at a currency dispense and control system, a currency dispense request from a user, wherein the currency dispense request (a) includes a desired withdrawal amount and (b) is input by the user via an input device;
determining, via a processor, whether the currency dispense request requires approval using an electronic fund transfer network;
if the currency dispense request is determined not to require approval using an electronic fund transfer network, determining independently of any electronic fund transfer network whether the user is authorized to receive the desired withdrawal amount;
after it is determined that the user is authorized to receive the desired withdrawal amount and before causing an amount of currency corresponding to the desired withdrawal amount to be dispensed, generating a time delay period during which no additional determinations of whether a user is authorized to receive a desired withdrawal amount are made;
causing an indication to be presented to the user that the time delay period has begun;
after the time delay period has expired and before causing the amount of currency corresponding to the desired withdrawal amount to be dispensed, prompting the user to enter a user identification code;
authenticating the user by comparing the user identification code entered by the user to data in a master list, the data in the master list defining a set of valid user identification codes; and
if the user is authenticated, causing a currency dispenser to dispense the amount of currency corresponding to the desired withdrawal amount.

10. The method of claim 9, wherein the step of determining whether the currency dispense request requires approval using an electronic fund transfer network is based on reading magnetically embedded data stored on a user card, the magnetically embedded data, when processed by the currency dispense and control system, bearing information that prompts the currency dispense and control system to use or not to use any electronic fund transfer network.

11. The method of claim 9, wherein the step of determining whether the currency dispense request requires approval using an electronic fund transfer network comprises reading magnetically embedded data stored on a user card and instructing the currency dispense and control system not to use any electronic fund transfer network to authorize the currency dispense request in response to the magnetically embedded data stored on the user card.

12. The method of claim 9, wherein the step of determining whether the currency dispense request requires approval using an electronic fund transfer network is based on reading magnetically embedded data stored on a user card, wherein the currency dispense and control system is instructed not to use any electronic fund transfer network to authorize the currency dispense request in response to the magnetically embedded data stored on the user card.

13. The method of claim 9, wherein the step of determining whether the currency dispense request requires approval using an electronic fund transfer network comprises reading, via a card reader, magnetically embedded data stored on a user card and determining, based on the magnetically embedded data stored on the user card, whether the user card is a standard consumer automated teller machine card or whether the user card is a non-standard card that is configured to operate with the currency dispense and control system to effect a dispensation of currency independently of any electronic fund transfer network.

14. The method of claim 9, wherein the step of determining independently of any electronic fund transfer network whether the user is authorized to receive the desired withdrawal amount comprises comparing the desired withdrawal amount to a maximum dispensation amount stored within the currency dispense and control system.

15. The method of claim 9, wherein the step of determining whether the currency dispense request requires approval from an electronic fund transfer network comprises reading, via a card reader, magnetically embedded data stored on a user card, the magnetically embedded data bearing instructions that cause the currency dispense and control system not to use any electronic fund transfer network.

16. The method of claim 9, further comprising:
before performing the step of determining whether the user is authorized to receive the desired withdrawal amount, prompting the user to enter a personal identification code;
determining whether the user entered a duress-dispensation personal identification code; and
if it is determined that the user entered a duress-dispensation personal identification code, alerting a set of individuals to an occurrence of a robbery and performing the step of determining whether the user is authorized to receive the desired withdrawal amount.

17. A computer-readable medium on which is stored computer software instructions, the instructions comprising:
instructions for, in response to receiving from a user a request to dispense a desired amount of currency, determining whether the request requires approval using an electronic fund transfer network based on reading, via a card reader, magnetically embedded data stored on a user card, the magnetically embedded data bearing instructions that cause a currency dispense and control system not to use any electronic fund transfer network;
instructions for determining independently of any electronic fund transfer network whether the user is authorized to receive the desired amount of currency if the request is determined not to require approval using an electronic fund transfer network; and
instructions for causing the currency dispense and control system to dispense an amount of currency corresponding to the desired amount of currency if it is determined independently of any electronic fund transfer network that the user is authorized to receive the desired amount of currency.

18. A currency dispense and control system, comprising:
a communication module for connecting to one or more electronic fund transfer networks;
a card reader for reading card-data stored on a user card;
a bill dispenser for dispensing currency; and
a processor configured to be coupled to the communication module, the card reader, and the bill dispenser, the processor configured to:
in response to receiving a request to dispense a desired amount of currency from a user, determine whether the request requires approval using an electronic fund transfer network based on reading, via the card reader, magnetically embedded data stored on the user card, the magnetically embedded data bearing instructions that cause the currency dispense and control system not to use any electronic fund transfer network;
operate in an automated teller machine mode if it is determined that the request requires approval using an electronic fund transfer network, the automated teller machine mode configured to (a) determine whether the user is authorized to receive the desired amount of currency by using an electronic fund transfer network accessed via the communication module and (b) cause the desired amount of currency to be dispensed via the bill dispenser if it is determined that the user is authorized to receive the desired amount of currency; and
operate in a local control mode if it is determined that the request does not require approval using an electronic fund transfer network, the local control mode configured to (a) determine whether the user is authorized to receive the desired amount of currency independently of any electronic fund transfer network and (b) cause the desired amount of currency to be dispensed via the bill dispenser if it is determined that the user is authorized to receive the desired amount of currency.

19. The system of claim 18, wherein the processor is further configured to authenticate the user's identity and determine eligibility of the user to access the local control mode by comparing a user identifier entered by the user with data in a master list defining a set of users entitled to access the local control mode.

20. The system of claim 19, wherein the user identifier relates to a merchant location in which the system is located.

21. The system of claim 19, wherein the user identifier entered by the user comprises biometric data.

22. The system of claim 18, wherein the processor is further configured to (a) record for each request the desired amount of currency dispensed via the bill dispenser and a user identifier associated with each request and (b) cause a printer coupled to the processor to print a report indicating for each request the desired amount of currency dispensed via the bill dispenser and the user identifier associated with the request.

23. The system of claim 18, wherein the processor is further configured to generate a time delay period during which the local control mode is inaccessible to authorize another request to receive a desired amount of currency.

24. The system of claim 23, wherein the time delay period is initiated before the desired amount of currency is dispensed via the bill dispenser and the user requesting the desired amount of currency enters a user identification code following the time delay period in order to cause the desired amount of currency to be dispensed via the bill dispenser.

25. The system of claim 23, wherein the time delay period is initiated after the desired amount of currency is dispensed via the bill dispenser.

26. The system of claim 18, wherein the processor is further configured to prevent the desired amount of currency from being dispensed via the bill dispenser if the request to dispense the desired amount of currency is received outside of a specified period of time, wherein the specified period of time is selected from the group consisting of an establishment's hours of operation and a shift at an establishment.

27. The system of claim 18, wherein the processor is further configured to prevent the desired amount of currency from being dispensed via the bill dispenser if the desired amount of currency exceeds a configurable maximum single dispensation amount.

28. The system of claim 18, wherein said one or more electronic fund transfer networks allow the currency dispense and control system to communicate with a bank associated with a user of the currency dispense and control system.

29. The system of claim 18, further comprising:
a memory configured to be coupled to the processor, the memory storing (1) authorized-user data defining a set of users entitled to access the local control mode and (2) authorized-dispensation data defining a maximum amount of currency each authorized-user is permitted to receive per request, wherein the processor is configured to (1) determine whether the request requires approval using an electronic fund transfer network by comparing card-data stored on the user card with the authorized-user data stored in the memory and (2) determine whether the user is authorized to receive the desired amount of currency independently of any electronic fund transfer network by comparing the desired amount of currency with the authorized-dispensation data stored in the memory.

30. A currency dispense and control system, comprising:
a communication module for connecting to one or more electronic fund transfer networks;
a bill dispenser for dispensing currency; and
a processor configured to be coupled to the communication module and the bill dispenser, the processor configured to:
  in response to receiving a request to dispense a desired amount of currency from a user, determine whether the request requires approval using an electronic fund transfer network;
  if it is determined that the request does not require approval using an electronic fund transfer network, determine whether the user is authorized to receive the desired amount of currency independently of any electronic fund transfer network;
  after it is determined that the user is authorized to receive the desired amount of currency and before causing the desired amount of currency to be dispensed via the bill dispenser, generate a time delay period during which no additional determinations of whether a user is authorized to receive a desired amount of currency are made;
  cause an indication to be presented to the user that the time delay period has begun;
  after the time delay period has expired and before causing the desired amount of currency to be dispensed, prompt the user to enter a user identification code;
  authenticate the user by comparing the user identification code entered by the user to data in a master list, the data in the master list defining a set of valid user identification codes; and
  if the user is authenticated, cause the bill dispenser to dispense the desired amount of currency.

31. The system of claim 30, further comprising:
a card reader configured to be coupled to the processor, wherein the card reader is configured to read card-data stored on a user card and wherein the processor is configured to determine whether the request requires approval using an electronic fund transfer network by reading, via the card reader, magnetically embedded data stored on the user card, the magnetically embedded data bearing instructions that cause the currency dispense and control system not to use any electronic fund transfer network.

32. A computer-readable medium on which is stored computer software instructions, the instructions comprising:
  instructions for, in response to receiving from a user a request to dispense a desired amount of currency, determining whether the request requires approval using an electronic fund transfer network;
  instructions for determining independently of any electronic fund transfer network whether the user is authorized to receive the desired amount of currency if the request is determined not to require approval using an electronic fund transfer network;
  instructions for, after it is determined that the user is authorized to receive the desired amount of currency and before causing an amount of currency corresponding to the desired amount of currency to be dispensed, generating a time delay period during which no additional determinations of whether a user is authorized to receive a desired amount of currency are made;
  instructions for causing an indication to be presented to the user that the time delay period has begun;
  instructions for, after the time delay period has expired and before causing the amount of currency corresponding to the desired amount of currency to be dispensed, prompting the user to enter a user identification code;
  instructions for authenticating the user by comparing the user identification code entered by the user to data in a master list, the data in the master list defining a set of valid user identification codes; and
  instructions for causing a currency dispenser to dispense the amount of currency corresponding to the desired amount of currency if the user is authenticated.

* * * * *